United States Patent [19]

Johnson

[11] E Patent Number: Re. 32,602

[45] Reissued Date of Patent: Feb. 16, 1988

[54] SPIRAL BAND LOCKING MECHANISM

[75] Inventor: Bruce S. Johnson, Dallastown, Pa.

[73] Assignee: Harsco Corporation, Wormleysburg, Pa.

[21] Appl. No.: 846,734

[22] Filed: Apr. 1, 1986

Related U.S. Patent Documents

Reissue of:

[64] Patent No.: 4,538,724
Issued: Sep. 3, 1985
Appl. No.: 643,269
Filed: Aug. 22, 1984

[51] Int. Cl.[4] ..... F42B 37/00

[52] U.S. Cl. ..... 206/3; 206/443

[58] Field of Search ..... 206/3, 443, 323, 440, 206/583

[56] References Cited

U.S. PATENT DOCUMENTS

| | | | |
|---|---|---|---|
| 1,120,244 | 12/1914 | Sachtleben | 206/3 |
| 1,991,481 | 2/1935 | Woodbridge | 206/3 |
| 2,371,663 | 3/1945 | Woodberry et al. | 206/3 |
| 3,185,035 | 5/1965 | Humphries | 206/3 |
| 3,515,321 | 6/1970 | Webster | 206/3 |
| 3,710,677 | 1/1973 | Mayer | 206/3 |
| 4,222,484 | 9/1980 | Howe | 206/3 |
| 4,286,708 | 9/1981 | Porzel | 206/3 |
| 4,356,913 | 11/1982 | Moraine | 206/3 |
| 4,508,215 | 4/1985 | Swarthout | 206/3 |

*Primary Examiner*—Joseph Man-Fu Moy
*Attorney, Agent, or Firm*—Kerkam, Stowell, Kondracki & Clarke

[57] ABSTRACT

A projectile holding apparatus or rack includes a plurality of spring-biased steel bands for securing a plurality of projectiles in the rack. Each of the securing steel bands may be individually moved to release or secure projectiles disposed within corresponding projectile storage tubes. The steel bands include a part to at least partially spiral around a projectile such that projectiles of different lengths may be accommodated. A gang control may be used for simultaneously locking and unlocking the projectiles within the projectile storage tubes. The gang control is further operable to move all of the securing bands from their releasing positions to their securing positions.

40 Claims, 15 Drawing Figures

SPIRAL BAND LOCKING MECHANISM

Matter enclosed in heavy brackets [ ] appears in the original patent but forms no part of this reissue specification; matter printed in italics indicates the additions made by reissue.

BACKGROUND OF THE INVENTION

The present invention relates to locking mechanisms for securing projectiles within projectile storage racks.

The modern war is often a war of logistics where the winner is determined by the ability to efficiently transport men and material. Accordingly, it is essential to optimize the conveyance of ammunition such as projectiles and shells.

For simplicity, "projectiles" as used herein shall be considered to include shells, missiles, torpedos, bombs, and more generally ammunition.

The storage or transportation of projectiles generally requires a balancing between two conflicting considerations. On the one hand, the projectiles should be stored such that it is easy to remove them from their storage mechanism as required for usage of the projectile. On the other hand, the projectiles must be stored such that they will not be jarred loose by nearby explosions or while being transported along a bumpy road. Generally, the more secure a projectile is from accidental dislodgement, the more time consuming it is to remove the projectile from its storage facility.

One common method for transportation and storage of projectiles is by use of a wooden pallet. The pallet is normally configured in two rows of four projectiles. The wooden pallet consists of upper and lower wood laminates held together with steel banding. The bases of the projectiles rest on the lower wood laminate board and the nose protrudes through holes drilled in the top wood laminate board.

The use of wooden pallets is subject to numerous disadvantages. For one thing, the steel banding must be cut or otherwise removed to allow access to all of the projectiles. This in turn necessitates the rebanding of the wooden pallet if the projectiles are to be resecured.

To support self-propelled howitzers in the field, it is necessary to carry ammunition such as 100–200 pound projectiles over rough terrain. The projectiles are carried in horizontal tubes in the self-propelled hawitzers and ammunition resupply vehicles. Safety considerations require that the projectiles be held in the tubes during travel.

Some of the prior art problems with storage and transportation of projectiles have been overcome by the projectile lock assembly disclosed in U.S. Pat. No. 4,344,528, issued Aug. 17, 1982 to Ayyala Perisastry, Richard A. Vishe, and Peter J. Hoet. The projectile lock assembly disclosed in that patent, which is assigned to the assignee of the present invention, uses a rack having a plurality of parallel cylindrical tubes. A number of locking assemblies are mounted along each of the tubes and used for individually locking projectiles within the associated tube.

Although the projectile lock assembly of the Perisastry et al. patent is extremely useful in providing a storage rack for projectiles, it has been subject to several disadvantages. In particular, each projectile must be individually secured within its corresponding storage tube. Depending upon the number of projectiles which need to be secured, this is time consuming. Indeed, if the projectile storage racks were within an ammunition supply vehicle, the vehicle should remain stationary (and thus quite vulnerable) until all of the projectiles were secured.

A disadvantage which is common to numerous prior art designs is their inability to adapt to different length and different diameter projectiles. A further disadvantage with most prior art projectile storage racks is that the projectiles are either locked into position or free to move. Such prior art designs do not have options other then locking the projectile (such that unlocking is likely to be time consuming) or having the projectiles unsecured (such that nearby explosions due to enemy action could cause the projectile to fall out of its rack).

A further disadvantage common among prior art projectile rack assemblies is that the controls used for locking and/or unlocking the projectiles are not very convenient to operate.

Another disadvantage among some prior art designs is the requirement for precision tolerances among numerous small parts such as cams.

OBJECTS AND SUMMARY OF THE INVENTION

Accordingly, it is a primary object of the present invention to provide a new and improved apparatus for securely holding projectiles.

A more specific object of the present invention is to provide an apparatus for securely holding projectiles wherein projectiles may be independently secured and/or released, the apparatus at the same time allowing for the projectiles to be secured as a group.

A further object of the present invention is to provide a projectile holding apparatus wherein projectiles may be placed in a secured condition of intermediate safety between a locked condition and a released condition.

A still further object of the present invention is to provide a projectile holding apparatus which will readily accommodate projectiles of different lengths and/or diameters.

Yet another object of the present invention is to provide a projectile holding apparatus which may be conveniently and very quickly used to secure projectiles.

The above and other objects of the present invention which will become apparent as the description proceeds are realized by an apparatus for securely holding projectiles comprising: (a) an assembly body having a front, a back, and a plurality of projectile storage zones extending from the back to the front, each of the zones being open at its front and operable to hold at least part of a projectile with the nose of the projectile freely; (b) a plurality of securing portions, each securing portion corresponding to one of the zones, and disposable in:

I. a securing position to prevent movement of a projectile out of the corresponding zone through the front; and II. a release position to allow removal of a projectile out of the corresponding zone through the front; (c) a plurality of manually operable controllers, each controller corresponding with one of the securing portions and independently disposable in:

I. a securing state disposing the corresponding securing portion in its securing position; and II. a release state disposing the corresponding securing portion in its release position;

and (d) a gang control disposable in a securing state wherein the securing portions are moved from their release positions to their securing positions. Each of the controllers is preferably disposed in its release state by placing it in a corresponding release catch. The gang control is operable to move the securing portions from their release positions to their securing positions by displacing the controllers from their corresponding release catches. Each of the controllers is spring-biased and each of the securing portions includes a securing band attached to one of the controllers. The gang control includes a slidable structure mounted at the front of the assembly body for up and down sliding movement. The gang control further includes at least one handle pivotably mounted to the front of the assembly body and operable to move the slidable structure. The gang control is further disposable in a locking state such that the securing portions may be locked against movement out of their securing positions. The gang control is further disposable in a neutral state wherein the controllers may be individually set to either their securing positions or their releasing positions, and, in the neutral state, the slidable structure of the gang control is intermediate to its positions corresponding to the securing state and the locking state. The securing portions are flexible bands operable to accommodate projectiles of varying lengths. The securing portions each include a spiral band part secured at its back to the assembly body and extending towards the front of the assembly body and operable to at least partially spiral around a projectile.

The invention may alternately be described as an apparatus for securely holding projectiles comprising the parts of (a) through (c) above combined with a gang control disposable in a locking state such that the securing portions may be locked against movement out of their securing positions. The gang control is preferably movably mounted to the assembly body and operable to change the state of the controllers such that the positions of the securing portions are in turn changed. The gang control is further disposable in a securing state wherein the securing portions are moved from their release positions to their securing positions. The apparatus further comprises at least one lock catch corresponding to each of the controllers and operable to prevent movement of the corresponding controller and, in turn, lock the corresponding securing portion in its securing position. Each lock catch is one of a series of serrated portions, each serrated portion corresponding to one of the controllers. Each serrated portion is mounted to the slidable structure for movement therewith. The slidable structure includes at least an upper horizontal bar, a lower horizontal bar, and two connecting bars extending therebetween, each horizontal bar corresponding to a row of the projectile storage zones.

The present invention may alternately be described as an apparatus for securely holding projectiles comprising the parts in (a) through (c) above and combined with a gang control movably mounted to the body and operable to change the state of the controllers such that the positions of the securing portions are in turn changed. The gang control is disposable in a locking state such that the securing portions may be locked against movement out of their securing positions.

The present invention may alternately be described as an apparatus for securely holding projectiles comprising: an assembly body having a front, a back, and a plurality of projectile storage zones extending from the back to the front, each of the zones being open at its front and operable to hold at least part of a projectile with the nose of the projectile freely accessible; a plurality of securing bands operable to secure projectiles at their ogives, at least one securing band corresponding to each of the zones and disposable in:

I. a securing position to prevent movement of a projectile out of the corresponding zone through the front; and II. a release position to allow removal of a projectile out of the corresponding zone through the front; and a plurality of spring-biased manually operable rod controllers, each controller corresponding with one of the zones, attached to a corresponding one of the securing bands, and having a front portion extending generally from the front towards the back, each controller disposable in:

I. a securing state disposing the corresponding securing band in its securing position; and II. a release state disposing the corresponding securing band in its release position. The release state of each controller occurs when the front portion of the controller is held by a corresponding release catch. The bands are operable to accommodate projectiles of varying lengths. The securing bands include a spiral band part for each of the zones, each spiral band part having a back secured to the assembly body and extending towards the front of the assembly body and operable to at least partially spiral around a projectile. Each controller is spring-biased towards its securing state by its own resilience. The apparatus further comprises a plurality of locking portions, each locking portion corresponding to one of the controllers, and operable to lock the corresponding controller in its securing position. The apparatus further comprises a gang control disposable in a locking state such that the securing bands are locked against movement out of their securing positions by the locking portions. The gang control is movably mounted to the assembly body and operable to change the state of the controllers such that the positions of the securing bands are in turn changed. Each of the locking portions is part of the gang control.

BRIEF DESCRIPTION OF THE DRAWINGS

The above and other features of the present invention will be more readily understood when the following detailed description of the invention is considered in conjunction with the accompanying drawings wherein like characters represent like parts throughout and in which.

DETAILED DESCRIPTION OF THE INVENTION

Figure 1:
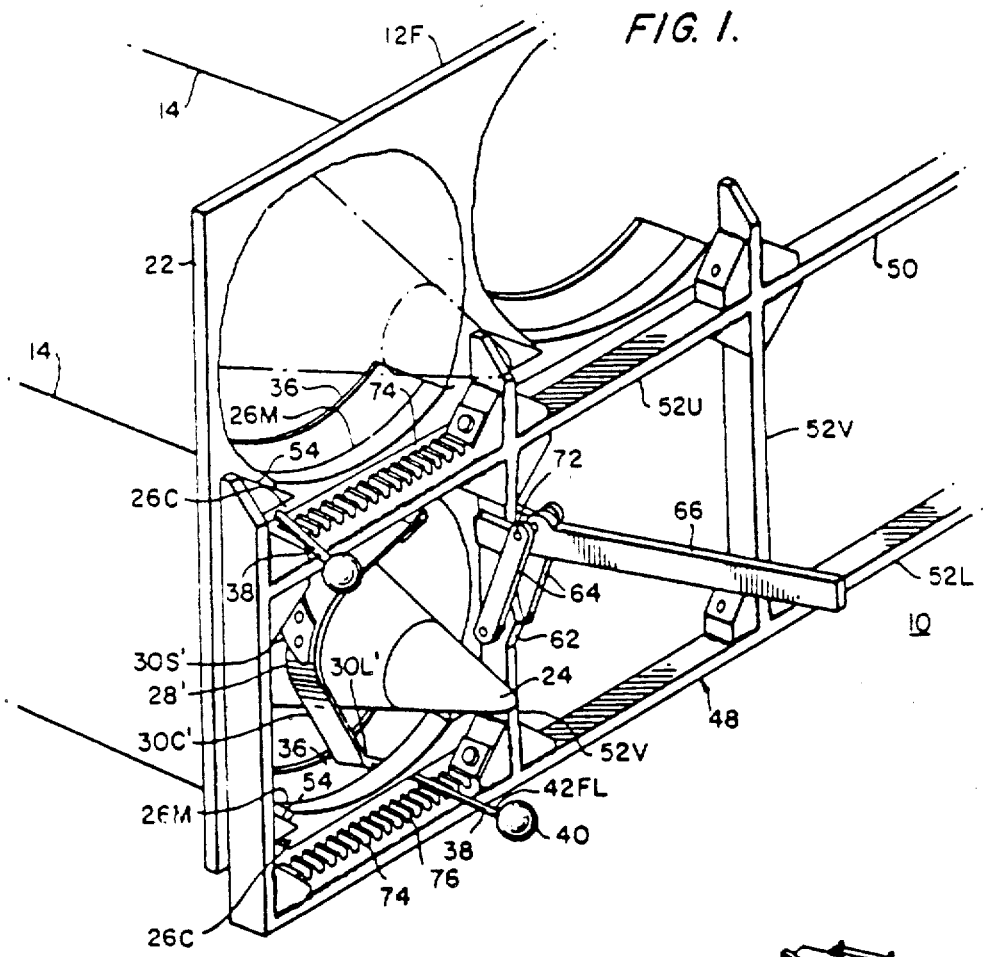
FIG. 1 shows a simplified perspective view with parts broken away and illustrating various of the projectile locking parts of the present invention.
Figure 2:
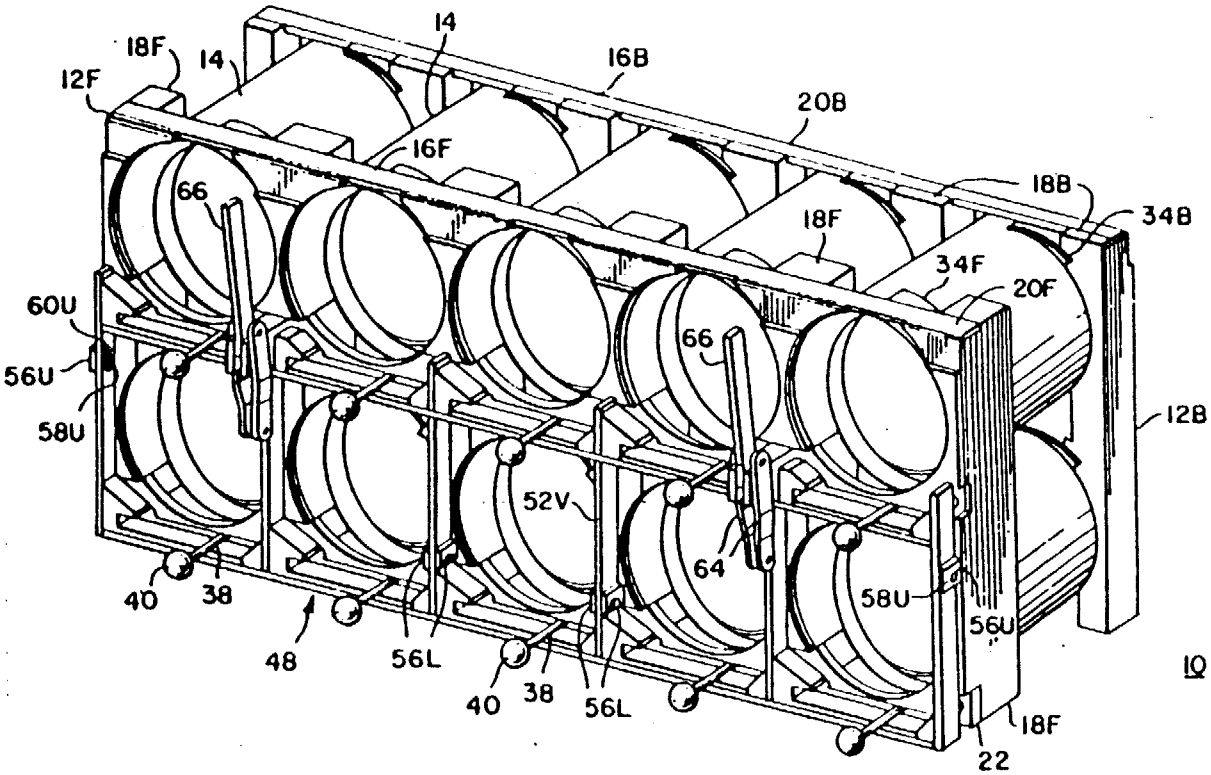
FIG. 2 shows a simplified perspective view of the projectile holding apparatus of the present invention from a different angle than FIG. 1.
Figure 3:
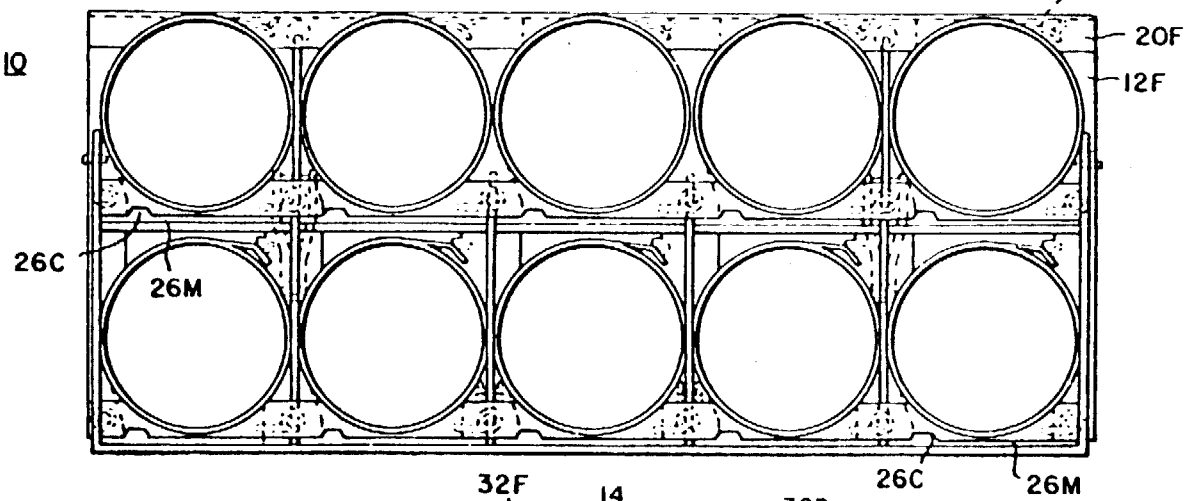
FIG. 3 shows a front view of the present invention.
Figure 4:
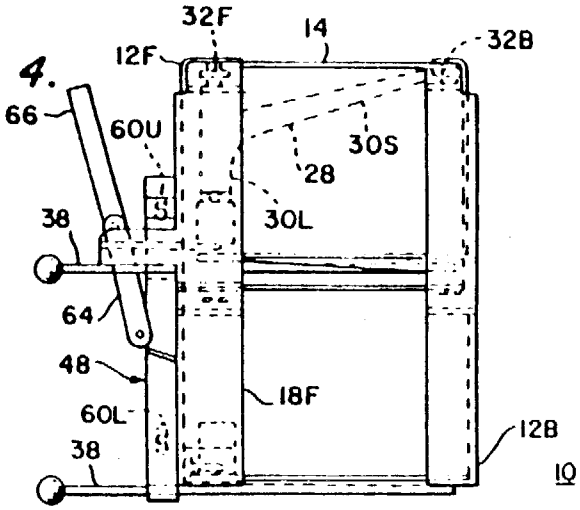
FIG. 4 shows a side view of the present invention.

Turning now to FIGS. 1–4, the overall structure of the projectile holding apparatus 10 of the present invention will be discussed. FIG. 1 shows a perspective view illustrating various key components of the present invention. FIG. 2 shows a simplified perspective view of the apparatus 10 from another angle. FIG. 3 shows a front view of the present invention, whereas FIG. 4 shows a side view.

The projectile holding apparatus 10 has a front 12F and a back 12B with a plurality of cylindrical projectile storage tubes 14 extending therebetween. Disposed at the back 12B is a back support structure 16B, whereas a front support structure 16F is disposed at the front 12F of the projectile holding apparatus or rack 10. Together, the front and back support structures 16F and 16B constitute a rack frame providing support for the projectile storage tubes 14 and any projectiles stored within the storage tubes. Each of the support structures 16F and 16B includes a number of vertical posts 18F and 18B respectively with one or more horizontal supporting members 20F and 20B respectively extending therebetween.

Although only top horizontal members 20F and 20B are shown (see especially FIG. 2), additional bottom and middle (i.e., intermediate the two horizontal rows of projectile storage tubes 14) may also be included. For simplicity sake, the horizontal members 20F and 20B are not shown in the simplified perspective of FIG. 1. Additionally, front-to-back support braces may optionally be included to extend from the front support structure 16F to the back support structure 16B.

The front support structure 16F further includes a front plate 22 best shown in FIG. 1. The front and back support structures 16F and 16B are positioned such that the two-by-five array of projectile storage tubes 14 are open at their fronts (corresponding to the front side 12F of the projectile storage rack 10) and at their backs (corresponding to the back of the projectile storage rack 10). The assembly body comprised of the projectile storage tubes 14 and front and back support structures 16F and 16B include a plurality of projectile storage zones extending from the back to the front, each of the zones defined by one of the projectile storage tubes 14 and operable to hold at least part of a projectile freely accessible through the open front of the zone as best shown for projectile 24 in FIG. 1.

The front support structure 16F has a release catch portion 26M corresponding to each of the projectile tubes 14 and projecting forwardly from the front plate 22. Each release catch portion 26M includes a release catch 26C as best shown in FIGS. 1, 2, and 3. Each of the release catches 26C corresponds on a one-to-one basis with one of the projectile storage tubes 14.

Figure 5:
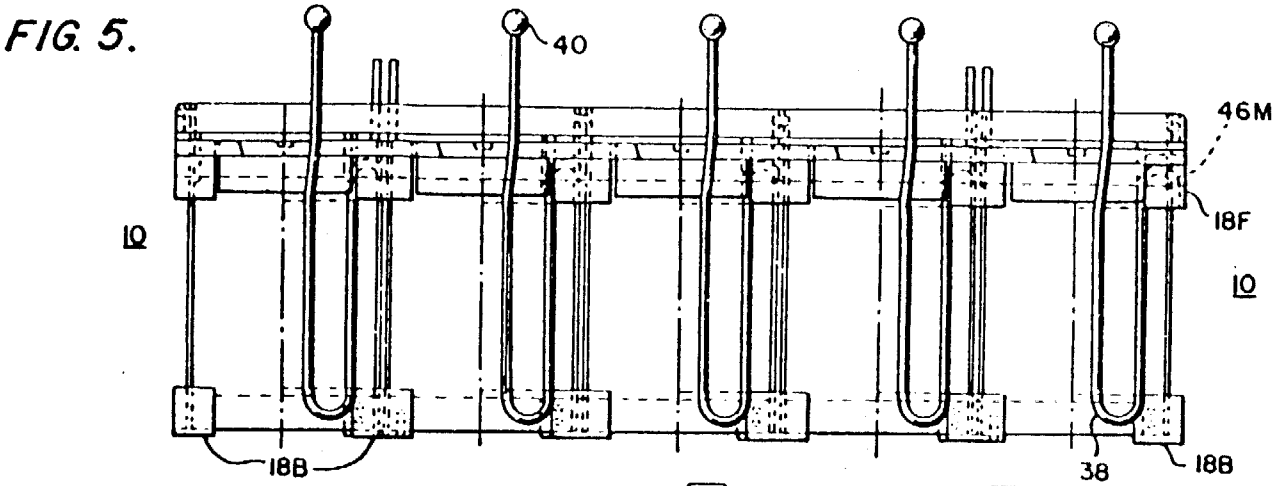
FIG. 5 shows a bottom view of the present invention.
Figure 9:
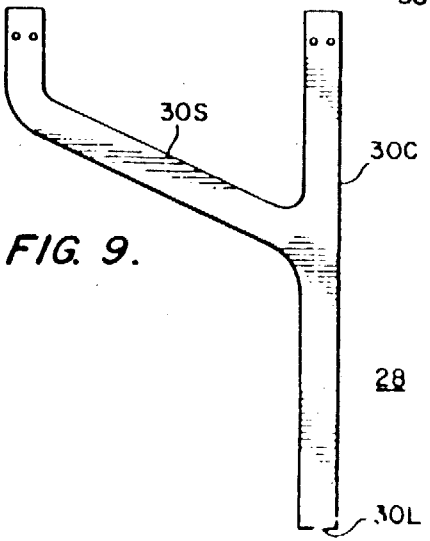
FIG. 9 shows a band configuration which may be used with the present invention.
Figure 10:
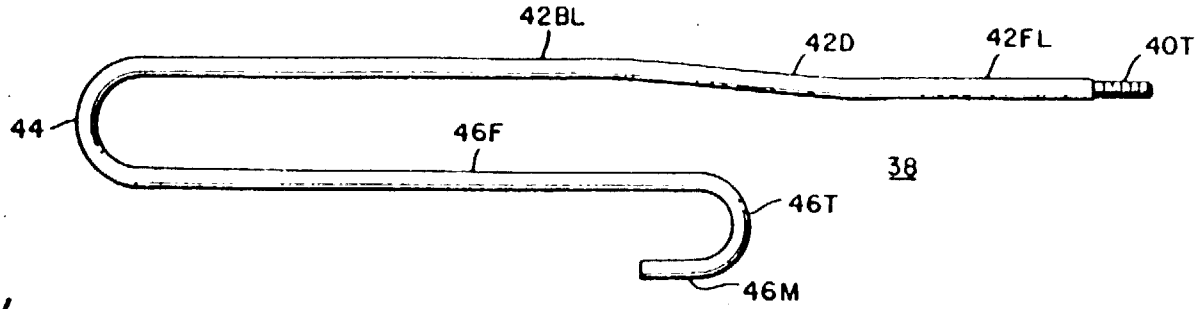
FIG. 10 shows a top view of a rod controller which may be used with the present invention.
Figure 11:
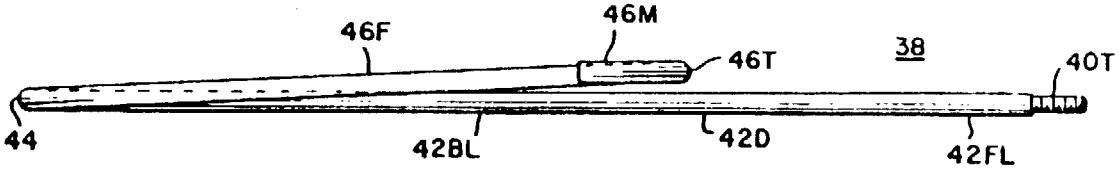
FIG. 11 shows a side of the rod controller.
Figure 12:
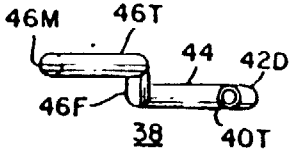
FIG. 12 shows an end view of the rod controller.

Concentrating now on FIGS. 1, 4, 5, and 9–12, the apparatus used for securing projectiles within the projectile storage tubes 14 will be discussed in detail. FIG. 5 shows a bottom view of the projectile holding apparatus or storage rack 10, whereas FIG. 9 shows a securing portion used with the present invention. FIGS. 10, 11, and 12 respectively show top, side, and end views of a rod controller used with the present invention.

Each of the projectile storage tubes 14 includes a securing band 28 disposed therein. The securing band 28 shown in plane view in FIG. 9 preferably includes a spiral band part 30S and a cylindrical band part 30C. As shown in FIG. 9, the securing band 28 may be a single band in a Y-like shape. Alternately, and as shown in FIG. 1, a securing band 28′ may include a separate spiral band part 30S′ and cylindrical band part 30C′ attached together. In either case, the mounting and operation of the band is basically the same.

As best shown in FIG. 4, the back of the spiral band part 30S is fixed at point 32B at the back 12B of projectile storage rack 10. Preferably, the securing point 32B is bolted to one of the back vertical posts 18B, each of the storage tubes 14 including a upwardly out turned part 34B (see especially FIGS. 2 and 3) to allow the back anchor point 32B to be disposed just outside the normal confines of cylindrical tube 14.

Disposed at the front of the securing band 28 (or 28′) is a front securing or anchor point 32F (FIG. 4) which is preferably outside of the corresponding cylindrical tube 14 as accommodated by front cut-out portion 34F (see especially FIG. 2) and mounted to one of the vertical support posts 18F.

As best shown in FIG. 1, the cylindrical part 30C′ (or 30C) of the steel band 28′ (or 28) extends down through a front slot 36 to a lower end 30L′ (or 30L) which is looped around or otherwise secured to a release rod controller 38 having a manual control knob 40 mounted upon threads 40T (FIGS. 10 and 11) at its front end. As best shown in FIGS. 5 and 10, each of the rod controllers 38 includes a front portion comprising a front linear part 42FL, a bend 42D, and a back generally linear part 42BL. At the back of part 42BL is a 180° bend 44 which leads to a forwardly extending portion 46F, a second 180° bend 46T which turns to a backward mounting part 46M. As shown in FIGS. 11 and 12, the parts 40T, 42FL, 42D and 42BL are coplanar with forwardly extending portion 46F extending out and above the plane.

As best shown in the bottom view of FIG. 5, tne mounting part 46M of each of the controllers 38 is hooked into a part of the vertical front post 18F. Because the front panel 22 (refer back momentarily to FIG. 2) is welded or otherwise fixed to the front of the front vertical post 18F, each of the resilient steel rod controllers 38 is captured within the corresponding projectile storage zone of the tubes 14. As illustrated in FIG. 5, each of the controllers 38 is disposed below the corresponding projectile storage tube 14.

The basic operation of the securing portions constituted by securing bands 28 or 28′ is best understood by reference to FIG. 1. As shown in the lower part of FIG. 1, the projectile 24 is secured within the corresponding projectile storage tube 14 by the securing band 28′ being biased rightwardly by the rod controller 38. This causes the cylindrical part 30C′ to compress against the ogive of the projectile 24 and the spiral part 30S′ to extend in a partial spiral around the projectile 24. The spring bias on controller 38 is due to its own resilience. In addition to pushing the lower part 30L′ of the securing band 28′ rightwardly, the natural resilience of the controller 38 and the location of the mounting part 46M generally bias the front part 42FL of the controller 38 upwardly against the release catch portion 26M.

In the position shown at the bottom of FIG. 1, the projectile 24 will be secured within the projectile storage zone defined by storage tube 14. In order to remove the projectile 24, one may simply use the manual knob 40 to slide the controller 38 leftwardly and up into the release catch 26 to assume the position as shown for the upper controller 38 in FIG. 1. In this position, the securing band 28' will be moved sufficiently outwardly (recall that the lower end 30L' of band 28' is secured to the controller 38) such that a projectile may be removed or placed within the projectile storage tube 14. In order to individually secure a new projectile within one of the storage tubes 14, one simply pushes down on the control knob 40 and the natural resilience of the spring rod controller 38 moves it back to the position shown for the bottom of FIG. 1.

Figure 13:
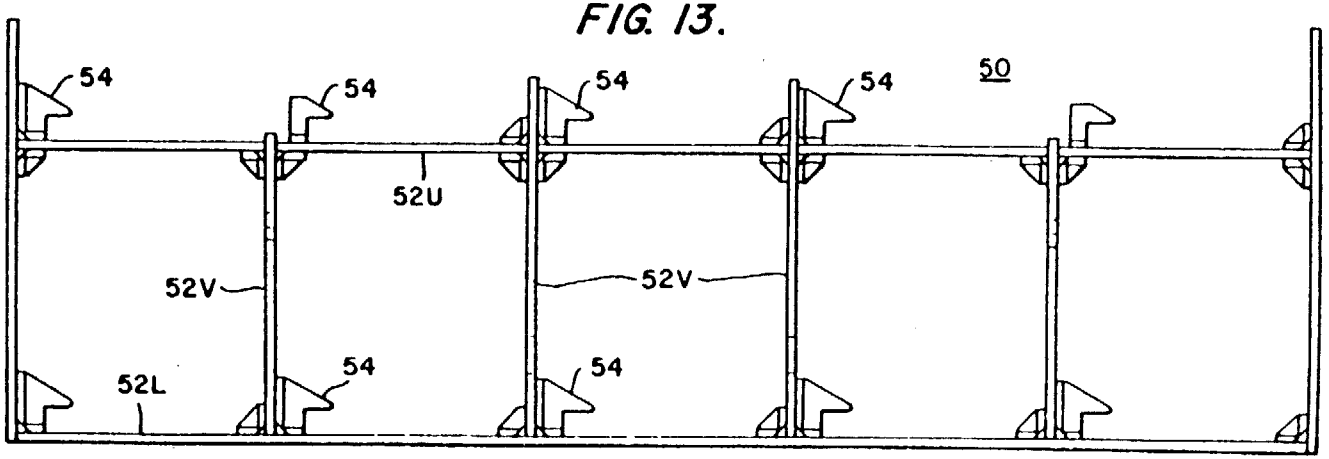
FIG. 13 shows a front view of a slidable structure used with the present invention.

Considering FIG. 13 in conjunction with FIGS. 1–4, a gang control 48 for use with the present invention will be discussed in detail. The gang control 48 includes a slidable structure 50 having an upper horizontal bar portion 52U and a lower horizontal bar portion 52L with a plurality of vertical portions 52V extending therebetween so as to form a picture frame type rectangular opening around each of the lower row projectile tubes 14. As shown, the intersections of the horizontal bar portions 52U and 52L with the vertical bar portions 52V may be reinforced with gussets.

As best shown in the front view of the slidable structure 50 a plurality of release fingers 54 are mounted upon the slidable structure 50. Each of the release fingers 54 may be used to release a corresponding controller 38 from its corresponding release catch 26C in a manner described in detail below.

Figure 8:
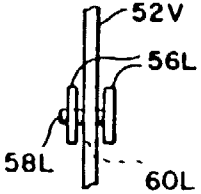
FIG. 8 shows a detail of a slide mounting of a part of the present invention.
Figure 7:
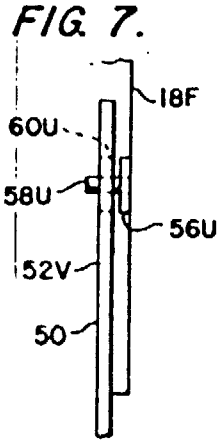
FIG. 7 shows a detail of a slide mounting of a part of the present invention.

With reference especially now to FIGS. 2, 3, 4, and the detailed slide mounting front views of FIGS. 7 and 8, the mounting of the slidable structure 50 will be discussed in detail. In particular, upper bosses 56U are fixedly mounted to the right and left vertical end posts 18F to project forwardly therefrom. Slide pins 58U slidably secure the structure 50 to the bosses 56U, the sliding being accommodated by the upper slots 60U as shown in the detailed front view of FIG. 7. Although the bosses 56U are shown disposed at the same level as the lower row of projectile tubes 14, the bosses 56U could alternately be mounted higher on the post 18F to be at the same level as the upper row of projectile storage tubes 14.

In addition to being slidably mounted upon the bosses 56U, the structure 50 is slidably mounted upon lower bosses 56L fixed to the front plate 22 or to the vertical posts 18F. As shown in the detailed view of one of the pairs of bosses 56L, a slide pin 58L extends between the bosses 56L and allows sliding movement of one of the vertical portions 52V of the slidable structure 50 by virtue of slot 60L.

Figure 14:
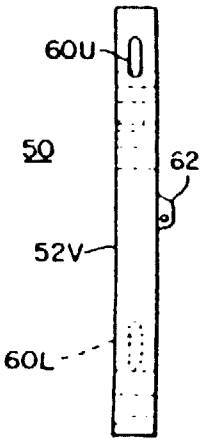
FIG. 14 shows a side view of the slidable structure.

The side view of FIG. 14 shows the positioning of slots 60U and 60L. Additionally, FIG. 14 shows that from the left side view of the slidable structure 50, a projecting portion 62 extends frontwardly therefrom. With reference also to FIGS. 1–4, it will be appreciated that two such projecting portions 62 extend forwardly from two of the vertical bar portions 52V to allow links 64 to be pivotably connected thereto. The opposite or upper end of the links 64 are pivotably connected to corresponding handles 66. With additional reference to the detailed front view of FIG. 6, the handles 66 of the gang control 48 are fixed to bosses 68 by pivot pins 70. The bosses 68 extend frontwardly from the projectile storage rack 10 to be within the connecting links 64. The connecting links 64 are pivotably connected to the handle 66 by pivot pin 72.

Concentrating now on FIG. 1, each of the controllers 38 (only two are shown in FIG. 1) has a corresponding serrated locking portion 74 (only two are shown in FIG. 1). For ease of illustration of other components, the serrated portions 74 are not shown in the figures other than FIG. 1. Each of the serrated locking portions 74 includes a number of grooves or lock catches 76 to which the corresponding controller 38 may be locked in a manner discussed in detail below.

The operation of the gang control 48 may be used to change the state of the controllers 38. Additionally, the gang control 48 may be used to lock the controllers 38 in their secured (i.e., right-most, projectile securing) positions.

In the position shown in FIG. 1, the gang control 48 is in a neutral state with the handles 66 (only one shown in FIG. 1) extending generally horizontally. The individual controllers 38 may be used to secure or release projectiles from the corresponding projectile storage tubes 14 by disposing the individual controller 38 within its corresponding catch 26C or releasing it from its corresponding catch 26C whereupon its natural resilience will spring it back to its securing position as shown at the bottom of FIG. 1. If it becomes advisable to immediately secure all of the projectiles, the gang control 48 may be used to change each of the controllers 38 from their release position at release catch 26C to their securing right-most position. Specifically, the handles 26 are rotated downwardly from the position shown in FIG. 1 so as to slide the structure 50 downwardly relative to the front plate 22. The release fingers 54 associated with each of the controllers 38 will push each of the controllers 38 below the release catch 26C such that it springs rightwardly. The handles 66 will be extending downwardly at or near vertical. Thus, the release handles 66 may be used to simultaneously secure all of the projectiles within the projectile storage rack 10. The spring force of the controllers 38 pushes the securing portion or securing band 28 or 28' against the projectile to prevent it from moving forwardly. However, in order to even more securely hold the projectiles 24, the handles 66 are then rotated upwardly to the position shown in FIGS. 2 and 4. This in turn moves the slidable structure 50 upwardly by virtue of the connecting links 64 such that the controllers 38 will be seated within one of the lock catches 76 in serrated locking portions 74. Noting that the release catch portions 26M project forwardly in between the slidable structure 50, the controllers 38 will then be locked in place. Sideways movement of the controllers 38 will be impossible due to the lock catches 76 on the serrated portions 74, whereas upwards movement of the controller 38 will be impossible due to the bottom surface of the release catch portion 26M.

Figure 6:
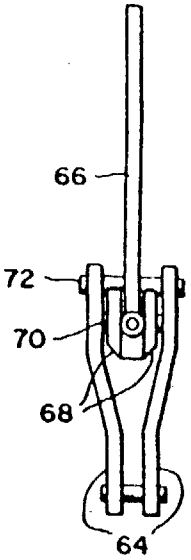
FIG. 6 shows a detailed view of a handle as used with the present invention.

With momentary reference back to FIG. 6, it should be appreciated that the positioning of the pivot pins 70 and 72 is such as to provide an over toggle arrangement for the handles 66. In other words, once the handles are in the upper position of FIGS. 2 and 4, they are stable and must be positively forced over the center of toggle to obtain the position shown in FIG. 1. Likewise, the position of FIG. 1 is a stable position for the handles 66.

From its locking state as shown in FIGS. 2 and 4, the gang control 48 may be disposed in its neutral state by simply rotating the handles 66 to the FIG. 1 position such that the individual controllers 38 may be used to secure and release projectiles. Moving the controllers 38 between their release and securing positions or states in turn moves the securing bands 28' or 28 between corresponding release and securing positions.

Figure 15:
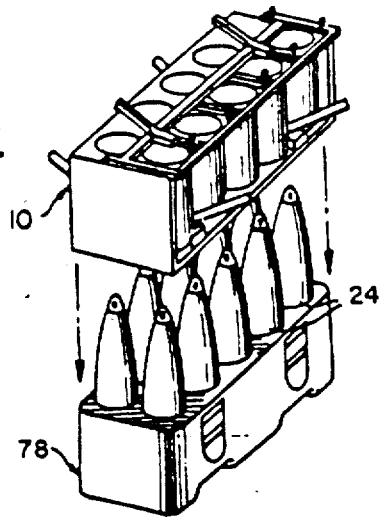
FIG. 15 shows how the present projectile holding apparatus may be attached to the base of a battlefield magazine.

As mentioned above, it is preferred that each of the storage tubes 14 includes an open back, this feature being preferable to allow the projectile holding apparatus 10 of the present invention to constitute a projectile locking front which may be attached to a base of a battlefield magazine 78 and shown with reference to FIG. 15. In particular, the projectile holding apparatus front 10 may be bolted or otherwise fixed to the battlefield magazine base 78. A particular manner of connecting the projectile holding apparatus 10 to the battlefield magazine base 78 is described in detail in the concurrently filed application entitled "BATTLEFIELD MAGAZINE", invented by the current inventor with Paul H. Borst, assigned to the assignee of the present application, and hereby incorporated by reference. That application, now U.S. patent application Ser. No. 643,189, filed 8-23-84, shows how the projectile holding apparatus 10 of the present invention may be used as a projectile locking front. Alternately however, the projectile holding apparatus 10 could constitute a complete rack without connection to the base 78. The rack would include a closed off back similar in structure to the above referenced Perisastry et al. patent except that the projectile securing and locking mechanisms used with the present invention are quite different.

The projectile holding apparatus 10 of the present invention is preferably made of steel or other durable materials.

The locking portions 74 may be serrated in the manner shown or alternately could be realized by a friction pad. In either case, it should be noted that the spiral band 28 or 28' will conform to the ogive of the projectile even with variations in projectile length. In other words, the reason for including a plurality of lock catches 76 within the locking portion 74 is to accommodate different locking positions for the controllers 38 depending upon length variations in the projectiles. The steel bands 28 or 28' will also accommodate some variations in diameter for the projectiles.

By mounting of the locking portions 74 upon the slidable structure 50 of the gang control 48, the gang control 48 may be used to gang lock and gang unlock each of the projectiles. By placement of each of the locking portions 74 upon the slidable structure 50 of gang control 48, the securing portions 28 or 28' may be locked and unlocked together by use of the handles 66. This gang locking occurs by simply rotating the handles 66 upwardly as discussed in detail above, whereas the gang unlocking occurs by moving the handles 66 down to their neutral position (FIG. 1). In the neutral position, the projectiles are unlocked in that there is no positive mechanical barrier towards their removal. Instead, the natural resilience of the spring rod controllers 38 holds them in place.

Although various specific structures have been described in detail herein, it is to be understood that these are for illustrative purposes only. Various modifications and adaptations will be readily apparent to those of ordinary skill in the art. Accordingly, the scope of the present invention should be determined by reference to the claims appended hereto.

What is claimed is:

1. An apparatus for securely holding projectiles comprising:

(a) an assembly body having a front, a back, and a plurality of projectile storage zones extending from said back to said front, each of said zones being open at its front and operable to hold at least part of a projectile with the nose of the projectile freely accessible;

(b) a plurality of securing portions, each securing portion corresponding to one of said zones, and disposable in:

I. a securing position to prevent movement of a projectile out of said corresponding zone through said front; and II. a release position to allow removal of a projectile out of the corresponding zone through said front;

(c) a plurality of manually operable controllers, each controller corresponding with one of said securing portions and independently disposable in:

I. a securing state disposing said corresponding securing portion in its securing position; and II. a release state disposing said corresponding securing portion in its release position; and (d) a gang control disposable in a securing state wherein said securing portions are moved from their release positions to their securing positions, *and wherein each of said securing portions includes a securing band which is operable in said securing position to directly contact a projectile in the corresponding zone, each securing band attached to a corresponding one of said controllers.*

2. The apparatus of claim 1 wherein each of said controllers is disposed in its release state by placing it in a corresponding release catch, and wherein said gang control is operable to move said securing portions from their release positions to their securing positions by displacing said controllers from their corresponding release catches.

3. The apparatus of claim 1 wherein each of said controllers is spring-biased and [each of said securing portions includes a securing band attached to one of said controllers] *each of said securing bands is spring-biased towards its securing position.*

4. [The apparatus of claim 1] *An apparatus for securely holding projectiles comprising:*

*(a) an assembly body having a front, a back, and a plurality of projectile storage zones extending from said back to said front, each of said zones being open at its front and operable to hold at least part of a projectile with the nose of the projectile freely accessible;*

*(b) a plurality of securing portions, each securing portion corresponding to one of said zones, and disposable in:*

*I. a securing position to prevent movement of a projectile out of said corresponding zone through said front; and*

*II. a release position to allow removal of a projectile out of the corresponding zone through said front;*

*(c) a plurality of manually operable controllers, each controller corresponding with one of said securing portions and independently disposable in:*

*I. a securing state disposing said corresponding securing portion in its securing position; and*

*II. a release state disposing said corresponding securing portion in its release position; and*

(*d*) *a gang control disposable in a securing state wherein said securing portions are moved from their release positions to their securing positions, and* wherein said gang control includes a slidable structure mounted at said front of said assembly body for up and down sliding movement.

5. The apparatus of claim 4 wherein said gang control further includes at least one handle pivotably mounted to said front of said assembly body and operable to move said slidable structure.

6. The apparatus of claim 4 wherein said gang control is further disposable in a locking state such that said securing portions may be locked against movement out of their securing positions.

7. The apparatus of claim 6 wherein said gang control is further disposable in a neutral state wherein said controllers may be individually set to either their securing positions or their releasing positions, and, in said neutral state, said slidable structure of said gang control is intermediate to its positions corresponding to the securing state of said gang control and the locking state of said gang control.

8. The apparatus of claim 1 wherein said securing portions are flexible bands operable to accommodate projectiles of varying lengths.

9. The apparatus of claim 1 wherein said securing portions each include a spiral band part secured at its back to said assembly body and extending towards said front of said assembly body and operable to at least partially spiral around a projectile.

10. An apparatus for securely holding projectiles comprising:

(a) an assembly body having a front, a back, and a plurality of projectile storage zones extending from said back to said front, each of said zones being open at its front and operable to hold at least part of a projectile with the nose of the projectile freely accessible;

(b) a plurality of securing portions, each securing portion corresponding to one of said zones, and disposable in:

I. a securing position to prevent movement of a projectile out of said corresponding zone through said front; and II. a release position to allow removal of a projectile out of the corresponding zone through said front;

(c) a plurality of manually operable controllers, each controller corresponding with one of said securing portions and independently disposable in:

I. a securing state disposing said corresponding securing portion in its securing position; and II. a release state disposing said corresponding securing portion in its release position; and (d) a gang control disposable in a locking state such that said securing portions may be locked against movement out of their securing positions, *and said gang control is further disposable in a securing state wherein said securing portions are moved from their release positions to their securing positions and disposable in a neutral state wherein said controllers may be individually set to either their securing positions or their releasing positions.*

11. The apparatus of claim 10 wherein said gang control is movably mounted to said assembly body and operable to change the state of said controllers such that the positions of said securing portions are in turn changed.

12. The apparatus of claim 11 wherein said gang control [is further disposable in a securing state wherein said securing portions are moved from their release positions to their securing positions] *includes a slidable structure mounted at said front of said assembly body for up and down sliding movement, and wherein said securing state corresponds to said slidable structure being disposed in a lowermost position, said locking state corresponds to said slidable structure being disposed in an uppermost position, and said neutral state corresponds to said slidable structure being disposed in an intermediate position.*

13. The apparatus of claim 10 further comprising at least one lock catch corresponding to each of said controllers and operable to prevent movement of the corresponding controller and, in turn, lock the corresponding securing portion in its securing position.

14. The apparatus of claim 13 wherein said gang control includes a slidable structure mounted at said front of said assembly body for up and down sliding movement.

15. The apparatus of claim 14 wherein each lock catch is one of a series of serrated portions, each serrated portion corresponding to one of said controllers.

16. The apparatus of claim 15 wherein each serrated portion is mounted to said slidable structure for movement therewith.

17. The apparatus of claim 14 wherein said gang control further includes at least one handle pivotably mounted to said front of said assembly body and operable to move said slidable structure.

18. The apparatus of claim 14 wherein [said gang control is further disposabl in a neutral state wherein said controllers may be individually set to either their securing positions or their releasing positions, and,] in said neutral state, said slidable structure of said gang control is below its position corresponding to the locking state of said gang control.

19. The apparatus of claim 14 wherein said zones are arranged in rows and said slidable structure includes at least an upper horizontal bar, a lower horizontal bar and two connecting bars extending therebetween, each horizontal bar corresponding to a row of said zones.

20. The apparatus of claim 13 wherein each of said controllers is spring-biased and each of said securing portions includes a securing band attached to one of said controllers.

21. An apparatus for securely holding projectiles comprising:

(a) an assembly body having a front, a back, and a plurality of projectile storage zones extending from said back to said front, each of said zones being open at its front and operable to hold at least part of a projectile with the nose of the projectile freely accessible;

(b) a plurality of securing portions, each securing portion corresponding to one of said zones, and disposable in:

I. a securing position to prevent movement of a projectile out of said corresponding zone through said front; and II. a release position to allow removal of a projectile out of the corresponding zone through said front;

(c) a plurality of manually operable controllers, each controller corresponding with one of said securing portions and independently disposable in:

I. a securing state disposing said corresponding securing portion in its securing position; and II. a release state disposing said corresponding securing portion in its release position; and (d) a gang control movably mounted to said body and operable to change the position of said securing portions, *and wherein said gang control is operable for gang unlocking by removing positive mechanical barriers to movement of stored projectiles in a plurality of said zones.*

22. The apparatus of claim 21 wherein said gang control is operable to change the state of said controllers such that the positions of said securing portions are in turn changed.

23. The apparatus of claim 21 wherein said gang control is disposable in a locking state such that said securing portions may be locked against movement out of their securing positions.

24. The apparatus of claim 23 wherein said gang control is further disposable in a securing state wherein said securing portions are moved from their release positions to their securing positions.

25. The apparatus of claim 24 wherein said gang control is further disposable in a neutral state wherein said controllers may be individually set to either their securing positions or their releasing positions.

26. The apparatus of claim 21 wherein each of said controllers is spring-biased and each of said securing portions includes a securing band attached to one of said controllers.

27. The apparatus of claim 21 wherein said gang control includes a slidable structure mounted at said front of said assembly body for up and down sliding movement.

28. The apparatus of claim 27 wherein each of said controllers is disposed in its release state by placing it in a corresponding release catch, and wherein said gang control is operable to move said securing portions from their release positions to their securing positions by displacing said controllers from their corresponding release catches.

29. The apparatus of claim 28 wherein said gang control further includes at least one handle pivotably mounted to said front of said assembly body and operable to move said slidable structure.

30. An apparatus for securely holding projectiles comprising:

(a) an assembly body having a front, a back, and a plurality of projectile storage zones extending from said back to said front, each of said zones being open at its front and operable to hold at least part of a projectile with the nose of the projectile freely accessible;

(b) a plurality of securing bands operable to secure projectiles at their ogives, at least one securing band corresponding to each of said zones and disposable in:

I. a securing position to prevent movement of a projectile out of said corresponding zone through said front; and II. a release position to allow removal of a projectile out of the corresponding zone through said front; and (c) a plurality of spring-biased manually operable rod controllers, each controller corresponding with one of said zones, attached to a corresponding one of said securing bands, and having a front portion extending generally from said front towards said back, each controller disposable in:

I. a securing state disposing said corresponding securing band in its securing position; and II. a release state disposing said corresponding securing band in its release position.

31. The apparatus of claim 30 wherein said front portion of each controller is held by a corresponding release catch when the controller is in its release state.

32. The apparatus of claim 31 wherein said bands are operable to accommodate projectiles of varying lengths.

33. The apparatus of claim 30 wherein said securing bands include a spiral band part for each of said zones, each spiral band part having a back secured to said assembly body and extending towards said front of said assembly body and operable to at least partially spiral around a projectile.

34. The apparatus of claim 30 wherein said controller is spring-biased towards its securing state by its own resilience.

35. The apparatus of claim 34 further comprising a plurality of locking portions, each locking portion corresponding to one of said controllers, and operable to lock the corresponding controller in its securing state.

36. The apparatus of claim 35 further comprising a gang control disposable in a locking state such that said securing bands are locked against movement out of their securing positions by said locking portions.

37. The apparatus of claim 36 wherein said gang control is movably mounted to said assembly body and operable to change the state of said controllers such that the positions of said securing bands are in turn changed.

38. The apparatus of claim 37 wherein each of said locking portions is part of said gang control.

39. The apparatus of claim 36 wherein said gang control includes a slidable structure mounted at said front of said assembly body for up and down sliding movement.

40. The apparatus of claim 30 further comprising a gang control disposable in a locking state such that said securing bands are locked against movement out of their securing positions.

* * * * *